(12) United States Patent
Packwood et al.

(10) Patent No.: US 11,768,669 B2
(45) Date of Patent: Sep. 26, 2023

(54) INSTALLING APPLICATION PROGRAM CODE ON A VEHICLE CONTROL SYSTEM

(71) Applicant: JAGUAR LAND ROVER LIMITED, Warwickshire (GB)

(72) Inventors: Simon Packwood, Coventry (GB); Richard Parker, Coventry (GB)

(73) Assignee: JAGUAR LAND ROVER LIMITED WHITLEY, Coventry (GB)

( * ) Notice: Subject to any disclaimer, the term of this patent is extended or adjusted under 35 U.S.C. 154(b) by 109 days.

(21) Appl. No.: 17/271,774

(22) PCT Filed: Jul. 1, 2019

(86) PCT No.: PCT/EP2019/067603
§ 371 (c)(1),
(2) Date: Feb. 26, 2021

(87) PCT Pub. No.: WO2020/043361
PCT Pub. Date: Mar. 5, 2020

(65) Prior Publication Data
US 2021/0326125 A1    Oct. 21, 2021

(30) Foreign Application Priority Data
Aug. 29, 2018    (GB) ...................... 1814013

(51) Int. Cl.
*G06F 8/61* (2018.01)
*B60W 50/06* (2006.01)
(Continued)

(52) U.S. Cl.
CPC ............... *G06F 8/61* (2013.01); *B60W 50/06* (2013.01); *G06F 9/442* (2013.01); *G06F 9/445* (2013.01);
(Continued)

(58) Field of Classification Search
CPC ......................................................... G06F 8/61
See application file for complete search history.

(56) References Cited

U.S. PATENT DOCUMENTS

2005/0090942 A1    4/2005  Shi
2005/0114869 A1*   5/2005  Iwamura ............... H04W 8/005
                                                  719/321
(Continued)

FOREIGN PATENT DOCUMENTS

DE        19921845 A1    11/2000
DE     102015216265 A1     3/2017
(Continued)

OTHER PUBLICATIONS

Combined Search Report under Sections 17 for Application No. GB1814013.7 dated Mar. 6, 2019.
(Continued)

*Primary Examiner* — Jae U Jeon
(74) *Attorney, Agent, or Firm* — Carlson, Gaskey & Olds, P.C.

(57) ABSTRACT

Aspects of the present invention relate to a method, a control system, a vehicle, a system, and a non-transitory computer readable medium. Application program code is downloaded to the control system via an interface and installed on the control system. Then, it is determined whether the control system is able to communicate with an external device via the interface while running the installed application program code, and the installed application program code is subsequently loaded on startup of the control system in dependence on a determination that the control system was able to communicate with the external device.

16 Claims, 5 Drawing Sheets

(51) Int. Cl.
*G06F 9/4401* (2018.01)
*G06F 9/445* (2018.01)
*G06F 11/14* (2006.01)

(52) U.S. Cl.
CPC ..... *G06F 11/1433* (2013.01); *B60W 2556/45* (2020.02); *G06F 2201/865* (2013.01)

(56) References Cited

U.S. PATENT DOCUMENTS

| | | | | |
|---|---|---|---|---|
| 2009/0177913 A1* | 7/2009 | Quinn | ................. | G06F 11/0793 |
| | | | | 714/4.1 |
| 2009/0319702 A1* | 12/2009 | Matumura | .............. | G06F 8/656 |
| | | | | 710/33 |
| 2013/0079950 A1 | 3/2013 | You | | |
| 2013/0246575 A1* | 9/2013 | Giaretta | ................ | H04W 48/18 |
| | | | | 709/217 |
| 2014/0136826 A1* | 5/2014 | Paek | ......................... | G06F 8/65 |
| | | | | 713/1 |
| 2016/0261705 A1* | 9/2016 | Lewandowski | ....... | H04L 67/025 |

FOREIGN PATENT DOCUMENTS

| | | |
|---|---|---|
| EP | 3399410 A1 | 11/2018 |
| WO | 2018/094180 A1 | 5/2018 |

OTHER PUBLICATIONS

International Search Report and Written Opinion of the International Searching Authority for International application No. PCT/EP2019/067603 dated Oct. 28, 2019.

* cited by examiner

INSTALLING APPLICATION PROGRAM CODE ON A VEHICLE CONTROL SYSTEM

TECHNICAL FIELD

The present disclosure relates to installing application program code on a vehicle control system. Aspects of the invention relate to a method, a control system, a vehicle, a system, and a non-transitory computer readable medium.

BACKGROUND

It is known to provide a controller for a vehicle on which new applications, such as software updates, can be installed. For example, an application may be installed via an over-the-air update procedure in which updated software is pushed to the vehicle via a wireless connection such as a mobile telecoms network, and automatically installed. However, if the new software does not function correctly on the controller, the vehicle owner may have to return the vehicle to a service centre to have replacement software installed or to physically replace the entire controller.

It is an aim of the present invention to address one or more of the disadvantages associated with the prior art.

SUMMARY OF THE INVENTION

Aspects and embodiments of the invention provide a method of installing an application, a control system for a vehicle, a system comprising a control system and an external device, a vehicle, and a non-transitory computer readable medium as claimed in the appended claims According to an aspect of the present invention there is provided a control system for a vehicle, the control system comprising one or more controllers, configured to: download application program code onto the control system via an interface; install the downloaded application program code on the control system; determine whether the control system is able to communicate with an external device via the interface while running the installed application program code; and subsequently load the installed application program code on startup of the control system, in dependence on a determination that the control system was able to communicate with the external device.

Optionally, the one or more controllers may collectively comprise: at least one electronic processor; and at least one electronic memory device operatively coupled to the at least one electronic processor and having instructions stored therein; wherein the at least one electronic processor is configured to access the at least one memory device and execute the instructions stored therein so as to download and install the application program code, determine whether the control system is able to communicate with the external device via the interface while running the installed application program code, and subsequently load the installed application program code on startup of the control system in dependence on a determination that the control system was able to communicate with the external device.

Optionally, the application installer may be configured to configure the control system to automatically load the installed application program code on each startup of the control system, in dependence on a determination that the control system was able to communicate with the external device.

Optionally, the application installer may be configured to configure the control system to automatically load the installed application program code on each startup by: setting a value of a flag in memory in dependence on a determination that the control system was able to communicate with the external device; and during each subsequent startup of the control system, checking the value of the flag and automatically launching the installed application program code in dependence on the value of the flag indicating that the control system was able to communicate with the external device.

Optionally, the application installer may be configured to: restart the control system without launching the installed application program code, in dependence on a determination that the control system was unable to communicate with the external device; obtain replacement application program code to replace the installed application program code; and install the replacement application program code.

Optionally, the application installer may be configured to obtain the replacement application program code by downloading the replacement application program code via the interface.

Optionally, the replacement application program code may comprise a backup of previous application program code that was replaced by the installed application program code.

Optionally, the application installer may be configured to: determine whether the control system is able to communicate with the external device via the interface while running the replacement application program code; and subsequently load the replacement application program code on startup of the control system, in dependence on a determination that the control system was able to communicate with the external device while running the replacement application program code.

Optionally, the application installer may be configured to determine whether the control system is able to communicate with the external device via the interface while running the installed application program code by: launching the installed application program code at the control system; receiving data from the external device via the interface, at the control system; controlling the installed application program code to write the received data to memory; and determining that the control system was able to communicate with the external device via the interface in dependence on the data in the memory matching a stored copy of the data.

Optionally, the application installer may be configured to: reboot the control system after receiving the data from the external device, wherein the installed application program code writes the received data to the shared memory as part of a shutdown procedure during said reboot.

Optionally, the application installer may be configured to determine whether the control system is able to communicate with the external device via the interface while running the installed application program code by: launching the installed application program code at the control system; receiving data from the external device via the interface, at the control system; controlling the installed application program code to write the received data to shared memory accessible to the control system and a bootloader application; rebooting the control system and launching the bootloader application; in the bootloader application, comparing the data in the shared memory to a copy of the data written to bootloader memory by the external device, where the bootloader memory comprises memory accessible to the bootloader application; and determining that the control system was able to communicate with the external device via the interface in dependence on the data in the shared memory matching the copy of the data in the bootloader memory.

Optionally, the bootloader application may comprise a backup of a previous application replaced by the installed application program code.

Optionally, the application installer may be configured to: initialise a system memory of the control system to an initialised state before determining whether the control system is able to communicate with the external device via the interface while running the installed application program code, wherein the initialised state may be a memory state configured to prevent the control system from communicating with the external device via the interface, such that a subsequent determination that the control system is able to communicate with the external device via the interface while running the installed application program code is indicative that the system memory was correctly initialised by the installed application program code when loaded.

According to yet another aspect of the invention, there is provided a vehicle comprising a control system as defined above. By using the application installer to verify that the control system is still able to communicate externally via the interface, after installing new application program code, future software updates can be installed remotely without having to return the vehicle to a service centre.

According to a further aspect of the invention, there is provided a system comprising: a control system as defined above; and the external device, connected to the control system via the interface.

Optionally, the external device may be configured to: transmit the data to the control system via the interface; read said data from the shared memory; compare the read data to a stored copy of the data; and send a result of said comparison to the control system. In this way, the external device can compare the data in the shared memory to the original data.

Optionally, the external device may be configured to: transmit the data to the controller via the interface; and write the copy of the data to the bootloader memory.

According to a still further aspect of the invention, there is provided a vehicle comprising a system as defined above.

According to a still further aspect of the invention, there is provided a method of installing application program code onto a control system for a vehicle, the method comprising: downloading the application program code to the control system via an interface; installing the downloaded application program code on the control system; determining whether the control system is able to communicate with an external device via the interface while running the installed application program code; and subsequently loading the installed application program code on startup of the control system, in dependence on a determination that the control system was able to communicate with the external device.

Optionally, the method may comprise configuring the control system to automatically load the installed application program code on each startup of the control system, in dependence on a determination that the control system was able to communicate with the external device.

Optionally, configuring the control system to automatically load the installed application program code on each startup may comprise: setting a value of a flag in a memory in dependence on a determination that the control system was able to communicate with the external device; and during each subsequent startup of the control system, checking the value of the flag and automatically launching the installed application program code in dependence on the value of the flag indicating that the control system was able to communicate with the external device.

Optionally, the method may comprise: restarting the control system without launching the installed application program code in dependence on a determination that the control system was unable to communicate with the external device; obtaining replacement application program code to replace the installed application program code; and installing the replacement application program code.

Optionally, obtaining the replacement application program code may comprise downloading the replacement application program code via the interface.

Optionally, the replacement application program code may comprise a backup of previous application program code that was replaced by the installed application program code.

Optionally, the method may comprise: determining whether the control system is able to communicate with the external device via the interface while running the replacement application program code; and subsequently loading the replacement application program code on startup of the control system, in dependence on a determination that the control system was able to communicate with the external device while running the replacement application program code.

Optionally, determining whether the control system is able to communicate with the external device via the interface while running the installed application program code may comprise: launching the installed application program code at the control system; receiving data from the external device via the interface, at the control system; controlling the installed application program code to write the received data to memory; and determining that the control system was able to communicate with the external device via the interface in dependence on the data in the memory matching a stored copy of the data.

Optionally, the memory may comprise shared memory accessible to the control system and the external device, and the method may comprise: at the external device, reading said data from the shared memory and comparing the read data to the stored copy of the data, wherein determining that the control system was able to communicate with the external device may comprise receiving a result of said comparison from the external device.

Optionally, the method may comprise rebooting the control system after receiving the data from the external device, wherein the installed application program code writes the received data to the shared memory as part of a shutdown procedure during said reboot.

Optionally, determining whether the control system is able to communicate with the external device via the interface while running the installed application program code may comprise: launching the installed application program code at the control system; receiving data from the external device via the interface, at the control system; controlling the installed application program code to write the received data to shared memory accessible to the control system and a bootloader application, and controlling the external device to write a copy of the data to bootloader memory accessible to the bootloader application; rebooting the control system and launching the bootloader application; in the bootloader application, comparing the data in the shared memory to the copy of the data in the bootloader memory; and determining that the control system was able to communicate with the external device via the interface in dependence on the data in the shared memory matching the copy of the data in the bootloader memory.

Optionally, the bootloader application may comprise a backup of a previous application replaced by the installed application program code.

Optionally, the method may comprise: initialising a system memory of the control system to an initialised state before determining whether the control system is able to communicate with the external device via the interface while running the installed application program code, wherein the initialised state is a memory state configured to prevent the control system from communicating with the external device via the interface, such that a subsequent determination that the control system is able to communicate with the external device via the interface while running the installed application program code is indicative that the system memory was correctly initialised by the installed application program code when loaded.

According to a still further aspect of the invention, there is provided a non-transitory computer readable medium comprising computer readable instructions that, when executed, perform a method as defined above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
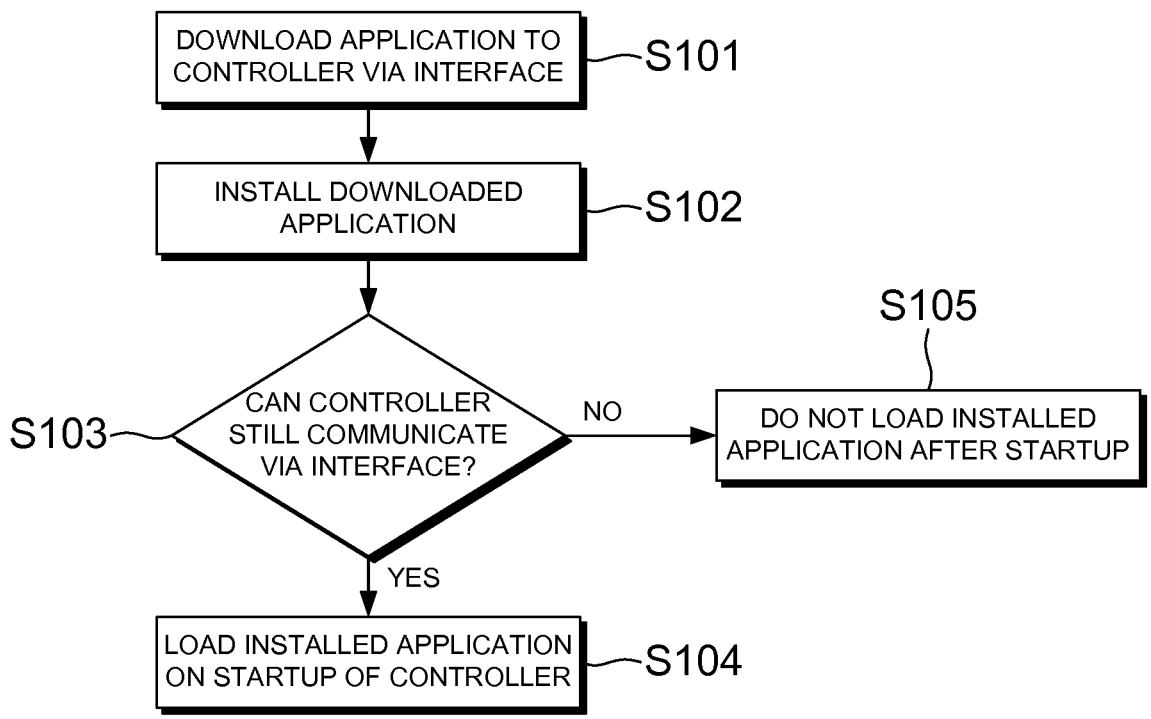
FIG. 1 is a flowchart showing a method of installing an application on a controller for a vehicle, in accordance with an embodiment of the invention.
Figure 2:
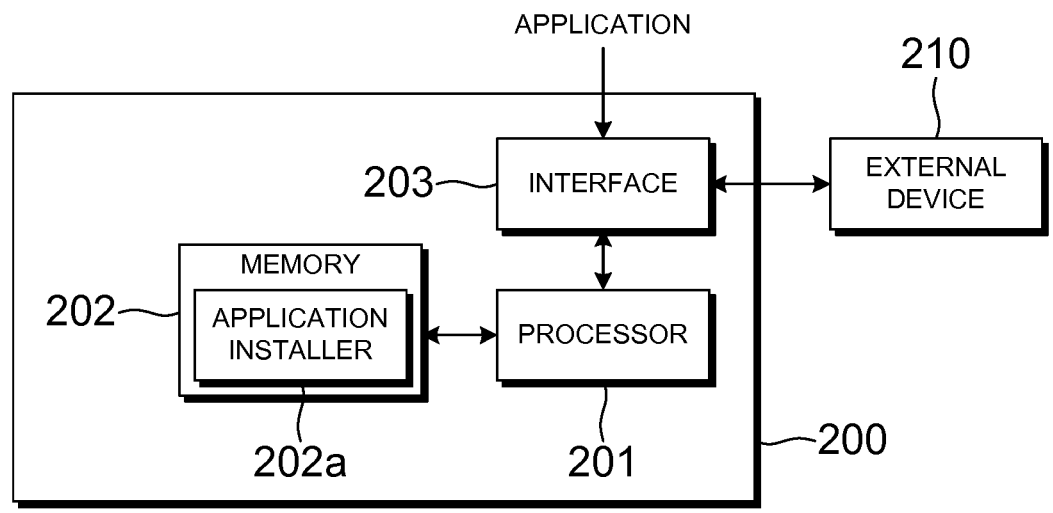
FIG. 2 shows a block diagram illustrating a system comprising a controller for a vehicle and an external device, in accordance with an embodiment of the invention.

A method of installing an application on a control system for a vehicle in accordance with an embodiment of the present invention is described herein with reference to the accompanying FIGS. 1 and 2. FIG. 1 is a flowchart showing the method, and FIG. 2 shows a block diagram schematically illustrating a system for performing the method. The system comprises the vehicle control system 200 and an external device 210. The vehicle control system 200 may comprise one or more controllers. The vehicle control system 200, hereinafter referred to simply as 'the controller', comprises a processor 201, memory 202, an application installer 202a, and an interface 203 through which application program code can be received. In the present embodiment the application installer 202a is embodied as software instructions stored in the memory 202. However, in other embodiments the application installer 202a may be embodied in hardware, for example an application specific integrated circuit (ASIC). For example, the application program code may be a complete application, or may comprise a software patch to be applied to an application that is already installed on the controller 200.

The interface 203 may, for example, be a wireless interface such as a mobile telecommunications network interface. A wireless interface 203 may be used to receive over-the-air software updates in the form of an application to be installed on the controller 200. Alternatively, the interface 203 may be a wired interface that is physically connected to another device in the vehicle, such that the controller 200 can receive software updates via the other device. The external device 210 can connect to the controller 200 via the interface 203.

With reference to FIG. 1, the method starts in step S101 by downloading the application to the controller 200 via the interface 203. Then, in step S102 the downloaded application is installed on the controller 200. Installing the application on the controller 200 may comprise storing the application in any suitable form of non-volatile memory, for example flash memory. After the application has been installed on the controller 200, the application may subsequently be launched by loading the stored application into volatile system memory, for example Random Access Memory (RAM) and/or CPU cache memory, for execution by one or more processors included in the controller 200. Next, in step S103 the application installer 202a determines whether the controller 200 is able to communicate with the external device 210 via the interface 203 while running the installed application. For example, in step S103 the application installer 202a may transmit a message to the external device 210 via the interface 203 and determine that the controller 200 is unable to communicate with the external device 210 via the interface 203 if a response is not received within a certain time period.

Next, in step S104 the installed application is loaded on a subsequent startup of the controller 200, in dependence on a determination in step S103 that the controller 200 was able to communicate with the external device 210. In this way, the controller 200 may only be permitted to launch the installed application on startup once it has been verified that the controller 200 is still able to communicate externally via the same interface 203 that is used to receive software updates. In the event that the newly-installed application causes other errors or issues, for example a decrease in performance or stability of the controller 200, an updated application or a previous version of the application may subsequently be received via the interface 203 and installed on the controller 200.

A method such as the one shown in FIG. 1 may therefore help to avoid a situation occurring in which installing an application on the controller 200 renders the controller 200 unable to receive further updates, an outcome commonly referred to as 'bricking' the controller 200.

If the application installer 202a determines in step S103 that the controller 200 is unable to communicate with the external device 210 via the interface 203 while running the installed application, then this may be indicative that the new application is unable to send and/or receive data via the interface 203. Accordingly, in step S105 of the present embodiment the installed application may not be launched on a subsequent startup of the controller 200. By preventing the installed application from launching on subsequent start-ups, the application installer 202a can prevent the controller 200 from being rendered permanently inoperable by the new application.

Figure 3:
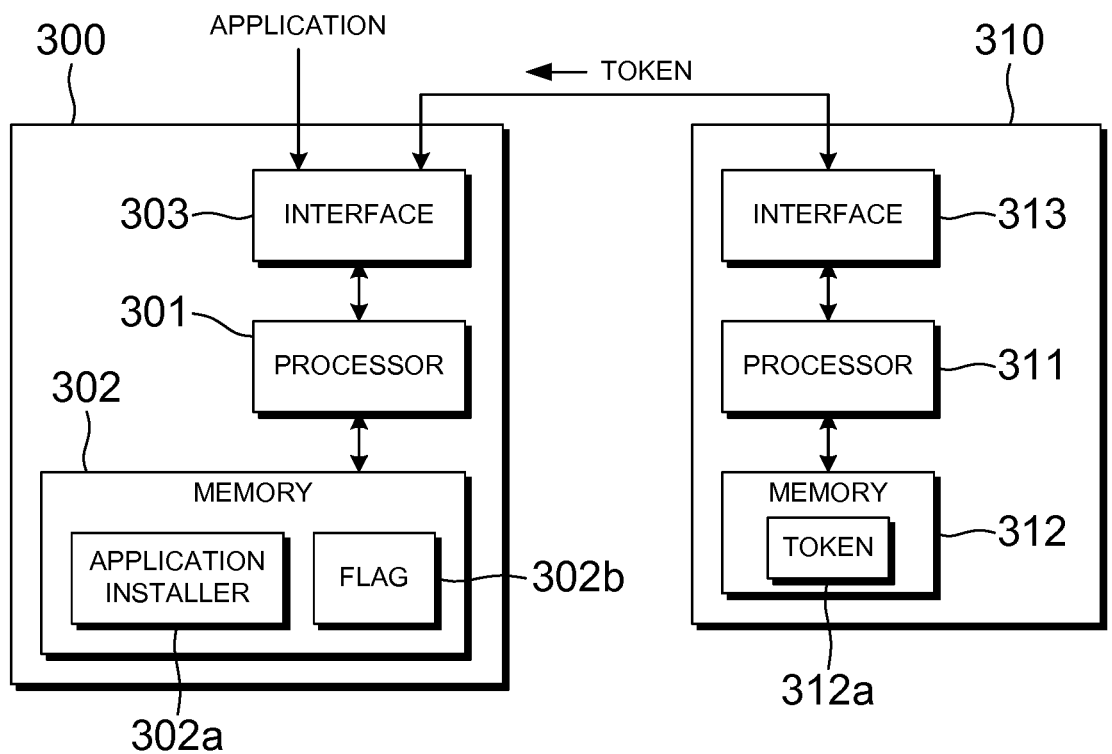
FIG. 3 shows a block diagram illustrating a system comprising a controller for a vehicle and an external device, in accordance with an embodiment of the invention.

With reference to FIG. 3, a system is illustrated in accordance with an embodiment of the invention. The system comprises a controller 300 for a vehicle and an external device 310. The controller comprises a first processor 301, first computer-readable memory 302, and a first interface 303. Similar to the embodiment of FIG. 2, the first memory 302 is arranged to store an application installer 302a in the form of software instructions. The first memory 302 is also arranged to store a Boolean flag 302b indicative of whether the controller 300 was able to communicate with the external device 310 via the first interface 303.

The external device 310 comprises a second processor 311, second memory 312 arranged to store a token 312a, and a second interface 313. The external device 310 can use the second interface 313 to connect to the first interface 303 of the controller 300. Methods that can be performed by the system of FIG. 3 are described later with reference to FIGS. 5, 6 and 7.

Figure 4:
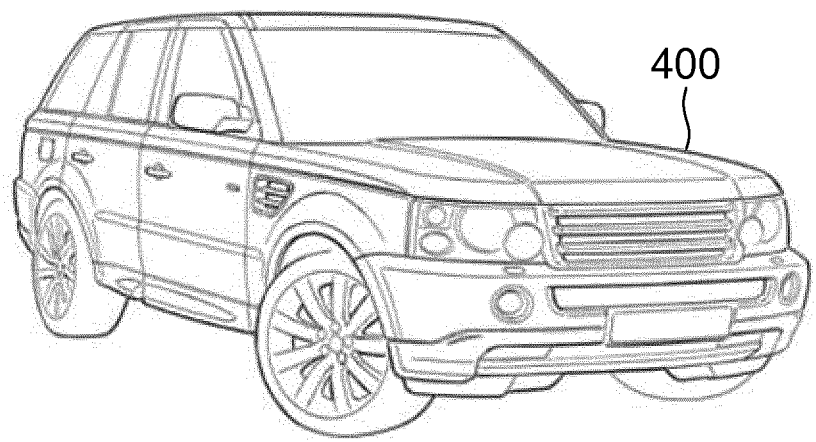
FIG. 4 shows a vehicle in accordance with an embodiment of the invention.

A vehicle 400 in accordance with an embodiment of the present invention is described herewith with reference to FIG. 4. The vehicle 400 may incorporate one or more of the embodiments of the invention described herein, such as the system of FIG. 2 or 3. A controller in the vehicle may be arranged to perform any of the methods described herein, such as the methods illustrated in the flowcharts of FIGS. 1, 5, 6 and 7.

Figure 5:
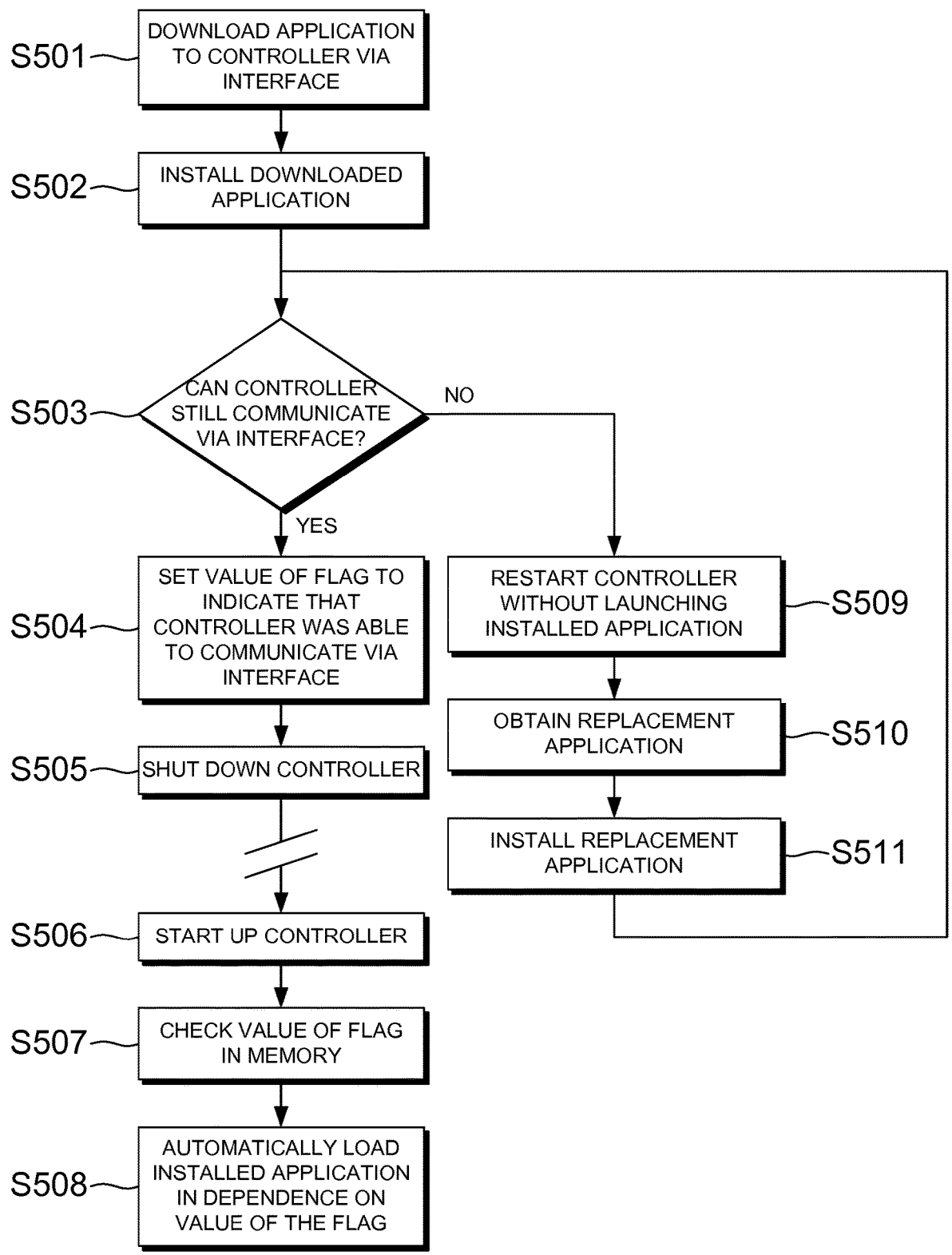
FIG. 5 shows a flowchart illustrating a method in accordance with an embodiment of the invention.

With reference to FIG. 5, a method that may be performed by a system such as the one shown in FIG. 3 will now be described, in accordance with an embodiment of the present invention.

As with the method of FIG. 1, in the present embodiment the method starts by downloading the application to the controller 300 via the first interface 303 in step S501. Then, in step S502 the downloaded application is installed on the controller 300. Next, in step S503 the application installer 302a determines whether the controller 300 is able to communicate with the external device 310 via the first interface 303 while running the installed application. In step S504 the application installer 302a sets the controller 300 to automatically load the installed application on each startup of the controller 300, in dependence on a determination in step S503 that the controller 300 was able to communicate with the external device 310.

In more detail, in the present embodiment the application installer 302a sets the controller 300 to automatically load the installed application on each startup by setting a value of the flag 302b in the first memory 302 in dependence on a determination that the controller 300 was able to communicate with the external device 310 via the first interface 303 in step S503. Then, in step S505 the controller 300 is shut down, and subsequently started up some time later in step S506. Alternatively, in step S505 the controller 300 may be restarted, in which case step S506 may follow immediately after step S505.

In some embodiments the flag 302b may be cleared after any operation that may affect the integrity of the installed application, for example applying a software patch or other form of update. Clearing the flag after such operations ensures that the application will not be automatically launched until it has been confirmed that the operation has not compromised the ability to communicate via the first interface 303, and until the value of the flag 302b has been reset accordingly.

In step S507, during each subsequent startup the controller 300 checks the value of the flag 302b. Then, in step S508 the controller 300 automatically launches the installed application in dependence on the value indicating that the controller 300 was able to communicate with the external device 310. Accordingly, by setting the value of the flag 302b in the first memory 302, the application installer 302a can set the controller 300 to automatically load the installed application on each startup.

If on the other hand it is determined in step S503 that the controller 300 was unable to communicate with the external device 310 via the first interface 303, then in step S509 the application installer 302a restarts the controller 300 without launching the installed application. Next, in step S510 the application installer 302a obtains a replacement application to replace the installed application, and installs the replacement application on the controller 300 in step S511.

In step S510, the replacement application may be obtained by downloading the replacement application via the first interface 303. Alternatively, the replacement application may comprise a backup of a previous application that was replaced by the installed application in step S502. In this case the backup of the previous application can be retrieved in step S510, and reinstalled in step S511. For example, the backup of the previous application may be stored in the first memory 302a or in a different form of storage. The backup of the previous application may be temporarily stored while the application installer 302a verifies that the new application is functioning correctly, and may be deleted following a determination in step S503 that the controller 300 is still able to communicate with the external device 310 via the first interface 303.

After installing the replacement application in step S511, in the present embodiment the application installer 302a returns to step S503 and repeats the verification process for the replacement application. Specifically, when returning to step S503 the application installer 302a determines whether the controller 300 is able to communicate with the external device 310 via the first interface 303 while running the replacement application. The application installer 302a can then set the controller 300 to subsequently automatically load the replacement application on startup, in dependence on a determination that the controller 300 was able to communicate with the external device 310 while running the replacement application, as described above with reference to steps S504 to S508.

In some scenarios, it is possible that the replacement application that is installed in step S511 may not function correctly, and may not be capable of communicating with the external device 310 via the first interface 303. However, in such a situation, the replacement application will fail the test at step S503 and so the controller will not be set to automatically load the installed application in steps S504 to S508. Alternatively, a replacement application may not be available in step S510. In both cases the controller 300 may temporarily be prevented from operating correctly, but is still prevented from being permanently bricked. The controller 300 will still be capable of receiving a new replacement application via the first interface 303 once one is available, and so can be restored to full functionality.

Figure 6:
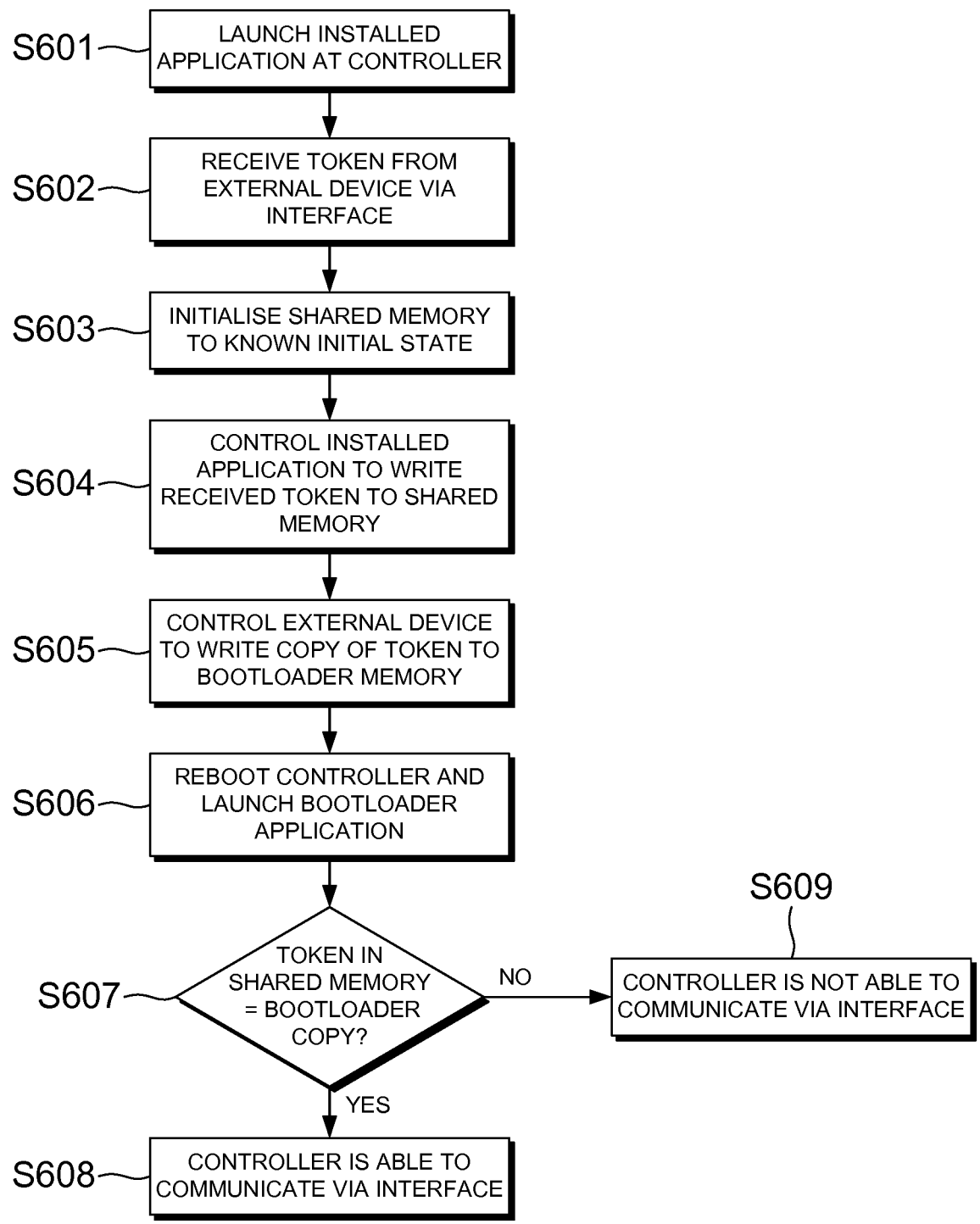
FIG. 6 shows a flowchart illustrating a method in accordance with an embodiment of the invention.

With reference to FIG. 6, a method that may be performed by a system such as the one shown in FIG. 3 will now be described, in accordance with an embodiment of the present invention. The method can be used to determine whether the controller 300 is able to communicate with the external device 310 via the first interface 303 in step S503 of FIG. 5.

The method starts by launching an installed application at the controller 300 in step S601. For example, the application that has been installed may be the new application that was installed in step S502 of FIG. 5, or may be the replacement application that was installed in step S511. Next, in step S602 the application installer 302a receives the token 312a from the external device 310 via the first and second interfaces 303, 313.

In step S603 the application installer 302a initialises system memory to an initialised state. Here, the system memory may be the first memory 302 or may be memory that is physically separate from the first memory 302. The initialised state is a memory state that is configured to prevent the controller 300 from communicating with the external device 310 via the first interface 303, such that a subsequent determination that the controller 300 is able to communicate with the external device 310 via the first interface 303 while running the installed application is indicative that the system memory was correctly initialised by the installed application when loaded. The system memory can be initialised by loading data that, unless subsequently overwritten with correct data, will cause communication to fail. In this way, the data that is loaded into system memory in the initialisation step can comprise data that would be considered erroneous, or corrupted, from the perspective of normal operation of the controller 300. Without this initialisation step, a scenario could potentially arise in which the new application software fails to initialise variables or hardware registers correctly, but in which the variables and/or registers happen to have previously been initialised correctly by a bootloader application. Hence, in some embodiments the system memory can be initialised by intentionally writing erroneous data in step S603. Initialising the system memory in this way can improve the robustness of the communication check, by providing confirmation that the installed application is capable of correctly initialising the system memory during the loading procedure. However, in some embodiments step S603 may be omitted.

In step S604 the application installer 302a controls the installed application to write the received token to shared memory which is accessible to both the controller 300 and a bootloader application. Here, the term 'bootloader application' refers to software that runs before an operating system is loaded on the vehicle controller 300, and which is capable of installing applications on the vehicle controller 300. The bootloader application may also be stored in the first memory 302, or may be stored in other memory such as an electrically erasable programmable read-only memory (EEPROM) in the controller 300. In some embodiments the bootloader application may comprise a backup of a previous application that was replaced by the installed application, such as a backup copy as described above with reference to steps S510 and S511 of FIG. 5.

In step S605, the application installer 302a controls the external device 310 to write a copy of the token 312a to bootloader memory that is accessible to the bootloader application. Depending on the embodiment, step S605 may be performed before or after step S604, or steps S605 and S604 may be performed concurrently.

Next, in step S606 the application installer 302a reboots the controller 300 and launches the bootloader application. Then, in step S607 the bootloader application compares the token in the shared memory to the copy of the token in the bootloader memory. In step S608, it is determined that the controller 300 was able to communicate with the external device 310 via the first interface 303 in dependence on the token in the shared memory matching the copy of the token in the bootloader memory. That is, if the tokens in the shared memory and the bootloader memory are found to match, this can be taken as confirmation that the token 312a was correctly received via the first interface 303 in step S602, and therefore confirmation that the controller 300 is still able to receive data via the first interface 303 while running the installed application.

In some embodiments, steps S602 to S607 may be repeated one or more times using different tokens to further improve the robustness of the process.

Figure 7:
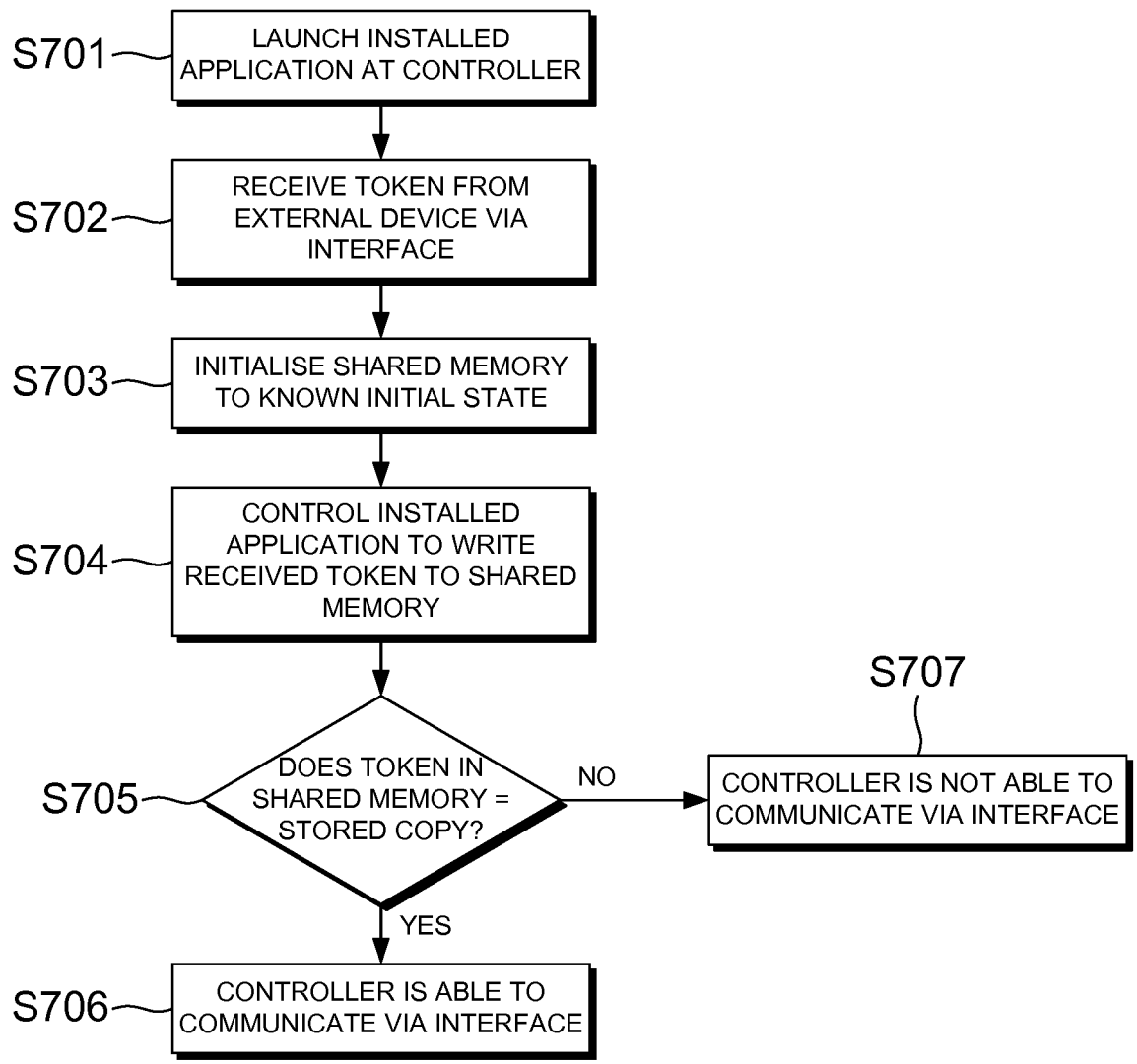
FIG. 7 shows a flowchart illustrating a method in accordance with an embodiment of the invention.

With reference to FIG. 7, a method that may be performed by a system such as the one shown in FIG. 3 will now be described, in accordance with an embodiment of the present invention. The method shown in FIG. 7 can be implemented as an alternative to the one shown in FIG. 6, to determine whether the controller 300 is able to communicate with the external device 310 via the first interface 303 in step S503 of FIG. 5.

As with step S601 of FIG. 6, in the present embodiment the method starts in step S701 by launching an installed application at the controller 300. For example, the application that has been installed may be the new application that was installed in step S502 of FIG. 5, or may be the replacement application that was installed in step S511. Next, the application installer 302a receives the token 312a from the external device 310 in step S702, initialises shared memory to an initialised state in step S703, and controls the installed application to write the received token to shared memory in step S704. Steps S702, S703 and S704 can be performed in a similar manner to steps S602, S603 and S604, respectively, and for the sake of brevity a detailed description will not be repeated here.

Then, in step S705 the application installer 302a checks whether the token in the shared memory matches a stored copy of the token 312a. In the present embodiment the external device 310 reads the token from the shared memory and compares the read token to the token 312a that is stored in the second memory 312 at the external device 310, and signals the result of the comparison to the application installer 302a. In step S705 the application installer 302a receives the result of the comparison from the external device 310.

As an alternative, in another embodiment in step S705 the external device 310 may retransmit the token 312a to the controller 300 via the first and second interfaces 303, 313, and the application installer 302a may compare the received token 312a to the value read from the shared memory in step S705.

In step S706, the application installer 302a determines that the controller 300 was able to communicate with the external device 310 via the first interface 303 in dependence on the token in the shared memory matching the stored copy of the token.

In some embodiments, in step S604 or S704 the application installer 302a may reboot the controller 300 after receiving the token from the external device 310, and cause the installed application to write the received token to the shared memory as part of a shutdown procedure during said reboot. This can allow the application installer 302a to verify the integrity of the shutdown process in the installed application, by checking whether the controller 300 is able to correctly write the received token to shared memory during the shutdown procedure. If the value read from the shared memory in step S607 or S705 is found to not match the copy of the token in the bootloader memory, then it can be assumed that either the token was not received correctly in step S602 or S702, or that the token was not written correctly during the shutdown procedure in step S604 or S704. In either event, the controller 300 may be prevented from automatically launching the installed application during subsequent startups in step S609 or S707.

In some embodiments, steps S702 to S705 may be repeated one or more times using different tokens to further improve the robustness of the process.

In the embodiments described above with reference to FIGS. 6 and 7, the application controller receives a token from the external device via the interface. Depending on the embodiment, the token may be a fixed value or may be generated dynamically. For example, in some embodiments the token may comprise a complex randomly-generated number, such that a different token may be generated each time the test is performed. In general, any suitable form of data can be shared between the application controller and the external device via the interface, including but not limited to tokens. By comparing the data that is written to shared memory by the installed application to a verification copy of the original data, the application controller can confirm whether or not the data was correctly received via the interface.

Embodiments of the invention have been described in which an application installer determines whether the controller is able to communicate with an external device via the interface while the controller is running a newly-installed application. The application installer may be embodied in hardware or software, depending on the embodiment. In a software implementation of the application installer, computer readable instructions that cause the functions of the application installer to be performed, when executed, can be stored in a suitable non-transitory computer readable medium, for example the controller memory 202, 302 of FIGS. 2 and 3. The computer readable instructions may be configured to cause the performance of any of the methods described above when executed.

It will be appreciated that various changes and modifications can be made to the present invention without departing from the scope of the present application.

The invention claimed is:

1. A control system for a vehicle, the control system comprising
at least one electronic memory device and
at least one controller configured to:
download application program code onto the control system via an interface;
install the downloaded application program code on the control system;
determine whether the control system is able to communicate with an external device via the interface while running the installed application program code; and
subsequently load the installed application program code on startup of the control system, in dependence on a determination that the control system was able to communicate with the external device,
wherein the at least one controller is configured to determine whether the control system is able to communicate with the external device via the interface while running the installed application program code by:
launching the installed application program code at the control system;
receiving data from the external device via the interface, at the control system;
controlling the installed application program code to write the received data to memory; and
determining that the control system was able to communicate with the external device via the interface in dependence on the data in the memory matching a stored copy of the data.

2. The control system according to claim 1, wherein the at least one controller collectively comprise:
at least one electronic processor; and
at least one electronic memory device operatively coupled to the at least one electronic processor, wherein instructions are stored in the at least one electronic memory device;
wherein the at least one electronic processor is configured to access the at least one electronic memory device and execute the stored instructions to download and install the application program code, determine whether the control system is able to communicate with the external device via the interface while running the installed application program code, and subsequently load the installed application program code on startup of the control system in dependence on a determination that the control system was able to communicate with the external device.

3. The control system according to claim 1, wherein, in dependence on the determination that the control system was able to communicate with the external device, the at least one controller is configured to configure the control system to automatically load the installed application program code on each startup of the control system by:
setting a value of a flag in memory in dependence on the determination that the control system was able to communicate with the external device; and
during each subsequent startup of the control system, checking the value of the flag and automatically loading the installed application program code in dependence on the value of the flag indicating that the control system was able to communicate with the external device.

4. The control system according to claim 1, wherein the at least one controller is configured to:
restart the control system without launching the installed application program code, in dependence on a determination that the control system was unable to communicate with the external device;
obtain replacement application program code to replace the installed application program code; and
install the replacement application program code.

5. The control system according to claim 4, wherein the at least one controller is configured to obtain the replacement application program code by
downloading the replacement application program code via the interface, or
obtaining a backup of previous application program code that was replaced by the installed application program code.

6. The control system according to claim 4, wherein the at least one controller is configured to:
determine whether the control system is able to communicate with the external device via the interface while running the replacement application program code; and
subsequently load the replacement application program code on startup of the control system, in dependence on a determination that the control system was able to communicate with the external device while running the replacement application program code.

7. The control system according to claim 1, wherein the at least one controller is configured to reboot the control system after receiving the data from the external device, wherein the installed application program code writes the received data to the memory as part of a shutdown procedure during said reboot.

8. The control system according to claim 1, wherein
the at least one controller is configured to initialize a system memory of the control system to an initialized state before determining whether the control system is able to communicate with the external device via the interface while running the installed application program code, and
the initialized state is a memory state configured to prevent the control system from communicating with the external device via the interface such that a subsequent determination that the control system is able to communicate with the external device via the interface while running the installed application program code is indicative that the system memory was correctly initialized by the installed application program code when loaded.

9. The control system according to claim 8, wherein
the external device is connected to the control system via the interface; and
the at least one controller is configured to determine whether the control system is able to communicate with the external device via the interface while running the installed application program code by:
  launching the installed application program code at the control system;
  receiving data from the external device via the interface, at the control system;
  controlling the installed application program code to write the received data to memory; and
  determining that the control system was able to communicate with the external device via the interface in dependence on the data in the memory matching a stored copy of the data.

10. The control system of claim 9, wherein
the at least one controller is configured to reboot the control system after receiving the data from the external device,
the installed application program code writes the received data to the shared memory as part of a shutdown procedure during said reboot, and
the external device is configured to:
  transmit the data to the control system via the interface;
  read said data from the shared memory;
  compare the read data to a stored copy of the data; and
  send a result of said comparison to the control system.

11. The control system according to claim 8, wherein the external device is configured to:
  transmit the data to the control system via the interface; and
  write the copy of the data to the bootloader memory.

12. A vehicle comprising the control system according to claim 1.

13. A method of installing application program code onto a control system for a vehicle, the method comprising:
  downloading the application program code to the control system via an interface;
  installing the downloaded application program code on the control system;
  determining whether the control system is able to communicate with an external device via the interface while running the installed application program code by:
    launching the installed application program code at the control system,
    receiving data from the external device via the interface, at the control system,
    controlling the installed application program code to write the received data to memory, and
    determining that the control system was able to communicate with the external device via the interface in dependence on the data in the memory matching a stored copy of the data; and
  subsequently loading the installed application program code on startup of the control system, in dependence on determining that the control system was able to communicate with the external device.

14. A non-transitory computer readable medium comprising computer readable instructions that, when executed, perform the method of claim 13.

15. A control system for a vehicle, the control system comprising
  at least one electronic memory device and
  at least one controller configured to:
  download application program code onto the control system via an interface;
  install the downloaded application program code on the control system;
  determine whether the control system is able to communicate with an external device via the interface while running the installed application program code; and
  subsequently load the installed application program code on startup of the control system, in dependence on a determination that the control system was able to communicate with the external device, wherein the at least one controller is configured to determine whether the control system is able to communicate with the external device via the interface while running the installed application program code by:
  launching the installed application program code at the control system;
  receiving data from the external device via the interface, at the control system;
  controlling the installed application program code to write the received data to shared memory accessible to the control system and a bootloader application;
  rebooting the control system and launching the bootloader application;
  in the bootloader application, comparing the data in the shared memory to a copy of the data written to bootloader memory by the external device, where the bootloader memory comprises memory accessible to the bootloader application; and
  determining that the control system was able to communicate with the external device via the interface in dependence on the data in the shared memory matching the copy of the data in the bootloader memory.

16. The control system according to claim 15, wherein the bootloader application comprises a backup of a previous application replaced by the installed application program code.

* * * * *